(12) United States Patent
Boeckeler

(10) Patent No.: US 7,127,620 B2
(45) Date of Patent: Oct. 24, 2006

(54) POWER ANALYSIS RESISTANT CODING DEVICE

(75) Inventor: Gregor Boeckeler, München (DE)

(73) Assignee: Infineon Technologies AG, Munich (DE)

(*) Notice: Subject to any disclaimer, the term of this patent is extended or adjusted under 35 U.S.C. 154(b) by 882 days.

(21) Appl. No.: 10/138,656

(22) Filed: May 3, 2002

(65) Prior Publication Data

US 2002/0131596 A1 Sep. 19, 2002

Related U.S. Application Data

(63) Continuation of application No. PCT/EP00/10551, filed on Oct. 26, 2000.

(30) Foreign Application Priority Data

Nov. 3, 1999 (EP) .................................. 99121760

(51) Int. Cl.
- *G06F 1/06* (2006.01)
- *G06F 1/08* (2006.01)
- *G06F 12/14* (2006.01)
- *H04K 1/02* (2006.01)
- *H04L 9/00* (2006.01)
- *G06F 1/04* (2006.01)

(52) U.S. Cl. .......................... 713/194; 326/8; 380/252; 380/287; 713/189; 713/501

(58) Field of Classification Search ........ 380/252–254, 380/287, 250; 713/189, 194; 326/8
See application file for complete search history.

(56) References Cited

U.S. PATENT DOCUMENTS

| | | | |
|---|---|---|---|
| 4,327,438 A | 4/1982 | Baier et al. | |
| 4,932,053 A | 6/1990 | Fruhauf et al. | ............. 380/252 |
| 5,404,402 A * | 4/1995 | Sprunk | ........................ 713/189 |
| 5,614,845 A * | 3/1997 | Masleid | ........................ 326/93 |
| 5,994,917 A * | 11/1999 | Wuidart | .......................... 326/8 |
| 5,995,629 A * | 11/1999 | Reiner | ......................... 380/265 |
| 5,998,978 A * | 12/1999 | Connell et al. | ............. 323/273 |
| 6,304,658 B1 | 10/2001 | Kocher et al. | |
| 6,327,661 B1* | 12/2001 | Kocher et al. | .............. 713/193 |
| 6,419,159 B1* | 7/2002 | Odinak | ........................ 235/492 |
| 6,698,662 B1* | 3/2004 | Feyt et al. | .................. 235/492 |

FOREIGN PATENT DOCUMENTS

CH 667 173 A5 9/1988

(Continued)

OTHER PUBLICATIONS

Thomas S. Messerges et al.: "Investigations of Power Analysis Attacks on Smartcards", *USENIX Association, Proceedings of the USENIX Workshop on Smartcard Technology (Smartcard '99)*, May 10-11, 1999, Chicago, Illinois, USA, pp. 151-161.

(Continued)

*Primary Examiner*—Jacques H. Louis Jacques
*Assistant Examiner*—Matthew Heneghan
(74) *Attorney, Agent, or Firm*—Laurence A. Greenberg; Werner H. Stemer; Ralph E. Locher

(57) ABSTRACT

A coding device for implementing a cryptographic encryption and/or access authorization includes a data processing unit, a decoupling unit, a power supply interface, a main clock supply unit, and a power profile generator generating a power profile and superimposing it on a power profile of the data processing unit to prevent an attack by correlation analysis of the power profile.

17 Claims, 3 Drawing Sheets

| | FOREIGN PATENT DOCUMENTS | |
|---|---|---|
| EP | 0 368 727 A1 | 5/1990 |
| EP | 0 486 368 A1 | 5/1992 |
| FR | 2 776 410 | 9/1999 |
| JP | 2 199 561 | 8/1990 |
| RU | 2 007 044 C1 | 1/1994 |
| RU | 2 040 858 C1 | 7/1995 |
| SU | 849514 | 7/1981 |
| WO | WO 99/35782 | 7/1999 |
| WO | 99/49416 | 9/1999 |

OTHER PUBLICATIONS

Kocher et al.: "Differential Power Analysis", Cryptography Research Inc., XP-000 863 414, 1999, pp. 388-397.

* cited by examiner

POWER CONSUMPTION:
CPU
(SP1)

⊕

POWER PROFILE GENERATOR:
(SP2)

=

OUTPUT
VOLTAGE SUPPLY
(SP3)

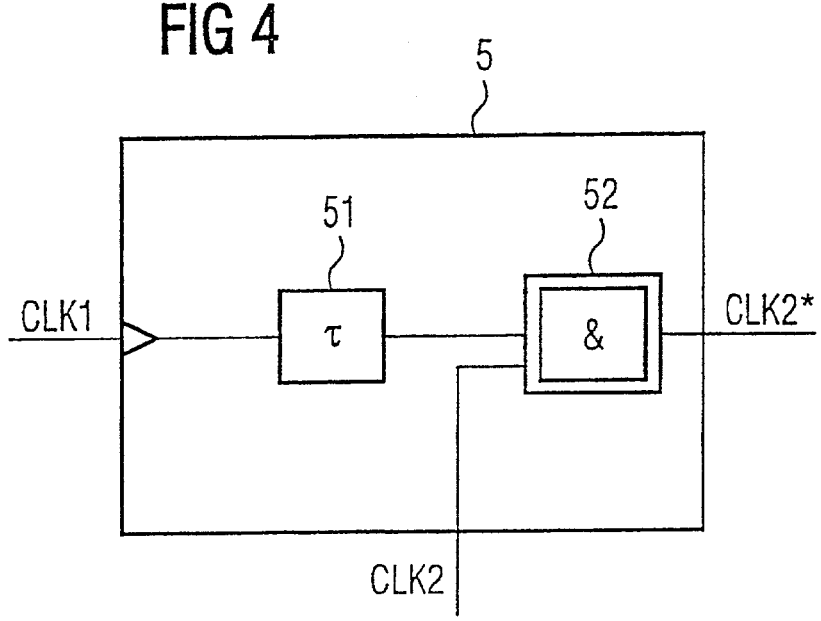
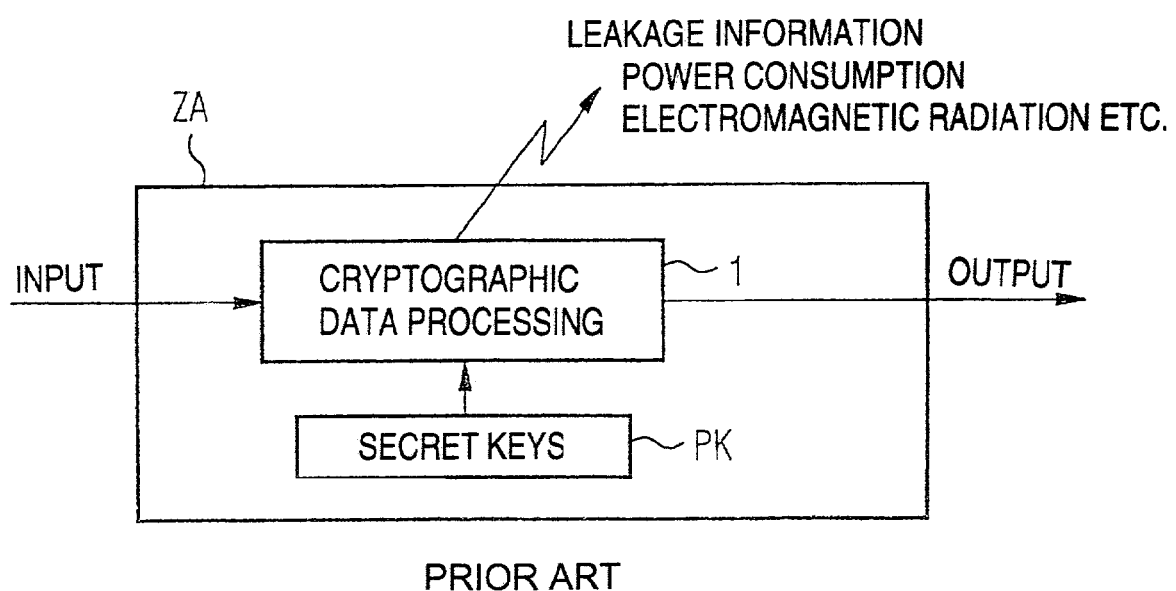
PRIOR ART

POWER ANALYSIS RESISTANT CODING DEVICE

CROSS-REFERENCE TO RELATED APPLICATION

This application is a continuation of copending International Application No. PCT/EP00/10551, filed Oct. 26, 2000, which designated the United States.

BACKGROUND OF THE INVENTION

Field of the Invention

The present invention relates to a coding device and, in particular, to a coding device for implementing cryptographic encryption and/or access authorization.

Most cryptographic systems require secure handling of the keys used in the cryptographic processing. In security systems with what are referred to as public keys, the associated private keys must be protected such that possible attackers cannot read or decrypt the keys in any circumstances because otherwise, for example, digital signatures can be falsified, data can be modified, and secret information can be deciphered.

A distinction is made here between symmetrical and asymmetrical algorithms or cryptographic protocols that are to be used to prevent an undesired data attack on confidential or secret data. For example, cryptographic coding devices for implementing encryption and/or access authorization must protect their secret keys even if they are in an attack-free environment. Prior art examples of such cryptographic coding devices are, for example, what are referred to as chip cards, smart cards, or security-related modules that permit protected access authorization or protected encryption of data in, for example, automatic teller machines, motor vehicle immobilizers, etc.

FIG. 5 shows a schematic view of such a coding device for implementing cryptographic encryption and/or access authorization that is composed substantially of a cryptographic data processing unit 1 and that cryptographically processes an input or input data using a secret key PK (private key). The data that is so processed is then output at an output, as a result of which, the cryptographic encryption or a protected access authorization is implemented. The automatic status device ZA that is illustrated in FIG. 5 is implemented, for example, as a chip card, smart card, protected microprocessor unit, or the like. Accordingly, the cryptographic coding device ZA uses the secret key PK for processing input information and for outputting or generating information, the cryptographic algorithms or protocols being usually discarded such that an attack on the data that is to be encrypted or the secret data at the inputting or outputting interface can be prevented.

However, it is proven the case that significantly more effective attacks on cryptographic coding devices or coding methods and their secret keys can also be made by what is referred to as leaked information. According to FIG. 5, such information is, for example, current consumption, electromagnetic radiation, or the like that permits inferences to be drawn regarding the secret keys used or the cryptographic method used during the cryptographic data processing.

The present invention is concerned here, in particular, with an attack using what is referred to as power analysis. In the analysis of a power profile of the automatic status device ZA, use is made of the fact that the integrated circuits are composed of a multiplicity of individual transistors that substantially operate as voltage-controlled switches. Here, current flows through a transistor substrate as soon as charges are applied to a gate or removed from it. The current, in turn, supplies charges to the gates of further transistors, as a result of which, in turn, further wiring sections or loads are switched. Such a switching behavior, which is carried out, in particular, when processing cryptographic algorithms, can be measured by the power supply of the automatic status device ZA and makes it possible, for example, for attackers to read the secret key PK.

The best-known forms of power analysis are simple power analysis (SPA), differential power analysis (DPA), and high-order differential power analysis (HO-DPA). While simple power analysis SPA substantially takes into account visual monitoring of the fluctuations in the power consumption, attacks by differential power analysis DPA make use of statistical analysis methods and error correction methods to extract information that is correlated with secret keys. Differential high-order power analyses (HO-DPA) improve the possibility of an attack to extract secret keys by a measurable power consumption, but differential power analysis is already sufficient in most cases.

To prevent such attacks on cryptographic coding devices, international publication WO 99/35782, corresponding to U.S. Pat. No. 6,304,658 to Kocher et al., discloses a cryptographic method and a cryptographic device by which the abovementioned power analyses are made ineffective. Essentially, the document describes a method and a device in which, by continuously changing the steps that are required for the cryptographic data processing, the leaked information that is readable by an attacker is, as it were, eliminated in a self-healing fashion. As a result, in particular, statistical evaluations are prevented and an attack by the current consumption of an automatic status device or by electromagnetic radiation is reliably prevented.

A disadvantage with such an implementation of protection from attack is, however, the fact that extensive interventions into the cryptographic software of the system or of the automatic status device have to be made. To be more precise, such protection can be carried out only with knowledge of the respective cryptographic algorithms or protocols that are correspondingly changed or that, if appropriate, change automatically. However, such intervention in the immediate software of the cryptographic data processing requires an extremely large amount of expenditure, and, furthermore, can only be carried out by experts and is often not desired by the respective users (customers).

SUMMARY OF THE INVENTION

It is accordingly an object of the invention to provide a coding device for implementing cryptographic encryption and/or access authorization that overcomes the hereinaforementioned disadvantages of the heretofore-known devices of this general type and that, in particular, reliably prevents power analysis without modifying the cryptographic status sequences.

With the foregoing and other objects in view, there is provided, in accordance with the invention, a coding device for at least one of implementing cryptographic encryption and access authorization including a data processing unit programmed to implement cryptographic operations, an external data interface, an internal data interface, a decoupling unit connected to the data processing unit, the external data interface, and to the internal data interface, the decoupling unit decoupling the external data interface from the internal data interface, a main clock supply unit generating a main clock signal, the main clock supply unit connected to the data processing unit, a power profile generator unit for generating an interference power profile, the power profile generator unit connected to the main clock supply unit and to the data processing unit, and a power supply interface for supplying power to the coding device, the power supply interface connected to the data processing unit and the power profile generator unit.

In accordance with another feature of the invention, the power profile generator unit has a multiplicity of loads, a switching unit connected to the loads, and a power profile generator connected to the loads and to the switching unit, the power profile generator switching the loads with the switching unit to generate the interference power profile.

In particular, by using a power profile generator unit for generating an interference power profile, an interference power profile is superimposed on a power profile of the automatic status device. As a result, power analysis for extracting a secret key or secret data becomes unusable.

The power profile generator unit preferably has a secondary clock supply unit for generating a secondary clock signal for actuating a power profile generator that switches a multiplicity of loads to generate the interference power profile. The interference power profile generator is, thus, operated with a secondary clock signal that is independent of the main clock signal. As a result, in particular, high-order power analyses can be prevented.

In accordance with a further feature of the invention, the power profile generator unit has a random number generator for generating random number values and changing the secondary clock signal as a function of the random number values. The random number generator can randomly change both the secondary clock signal and the main clock signal independently of one another. As such, in particular, statistical (differential) power analysis is reliably prevented.

In accordance with an added feature of the invention, the random number generator also changes the main clock signal as a function of the random number values.

In accordance with an additional feature of the invention, the random number generator changes a switching behavior of the switching unit as a function of the random number values.

In addition, the power profile generator unit can have a synchronizing circuit for generating a power profile generator clock signal based upon the main clock signal and secondary clock signal. As a result, further decoupling from the randomly generated main signals and secondary clock signals is made possible.

In accordance with yet another feature of the invention, the synchronizing circuit prevents correlation between the main clock signal and the power profile generator clock signal in the time domain and the frequency domain.

In particular, by using a synchronizing circuit that prevents correlation between the main clock signal and the power profile generator clock signal in the time domain and frequency domain, any type of high-order power analyses are prevented because it is not possible to draw conclusions as to the actual cryptographic data processing processes.

In accordance with yet a further feature of the invention, the synchronizing circuit prevents the main clock signal and the secondary clock signal from beating in a way visible at the power supply interface.

By providing a synchronizing circuit that prevents the main clock signal and second clock signal from beating in a way that is visible at the power supply interface, a cryptographic coding device is provided that is immune to the currently available power analyses.

In accordance with yet an added feature of the invention, the synchronizing circuit has a delay element for delaying the main clock signal.

In accordance with yet an additional feature of the invention, the synchronizing circuit has a signal edge-triggered AND gate for generating the power profile generator clock signal with triggering by the secondary clock signal as a delayed main clock signal.

In accordance with again another feature of the invention, the delay element is adjustable.

In accordance with again a further feature of the invention, the data processing unit has a power profile with a maximum excursion and the power profile generator unit generates the interference power profile to have a maximum excursion approximately equal to the power profile of the data processing unit.

In accordance with again an added feature of the invention, the power profile generator unit has an on-off switch for switching off the power profile generator unit. Such switching off is carried out for non-security-related operations. Thus, the power consumption of the coding device can be considerably reduced.

In accordance with a concomitant feature of the invention, the internal data interface connects the decoupling unit to the data processing unit.

Other features that are considered as characteristic for the invention are set forth in the appended claims.

Although the invention is illustrated and described herein as embodied in a coding device, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 4 is a simplified block circuit diagram of the synchronizing circuit of FIG. 1; and FIG. 5 is a simplified block circuit diagram of a power analysis attack according to the prior art.

DESCRIPTION OF THE PREFERRED EMBODIMENTS

Figure 1:
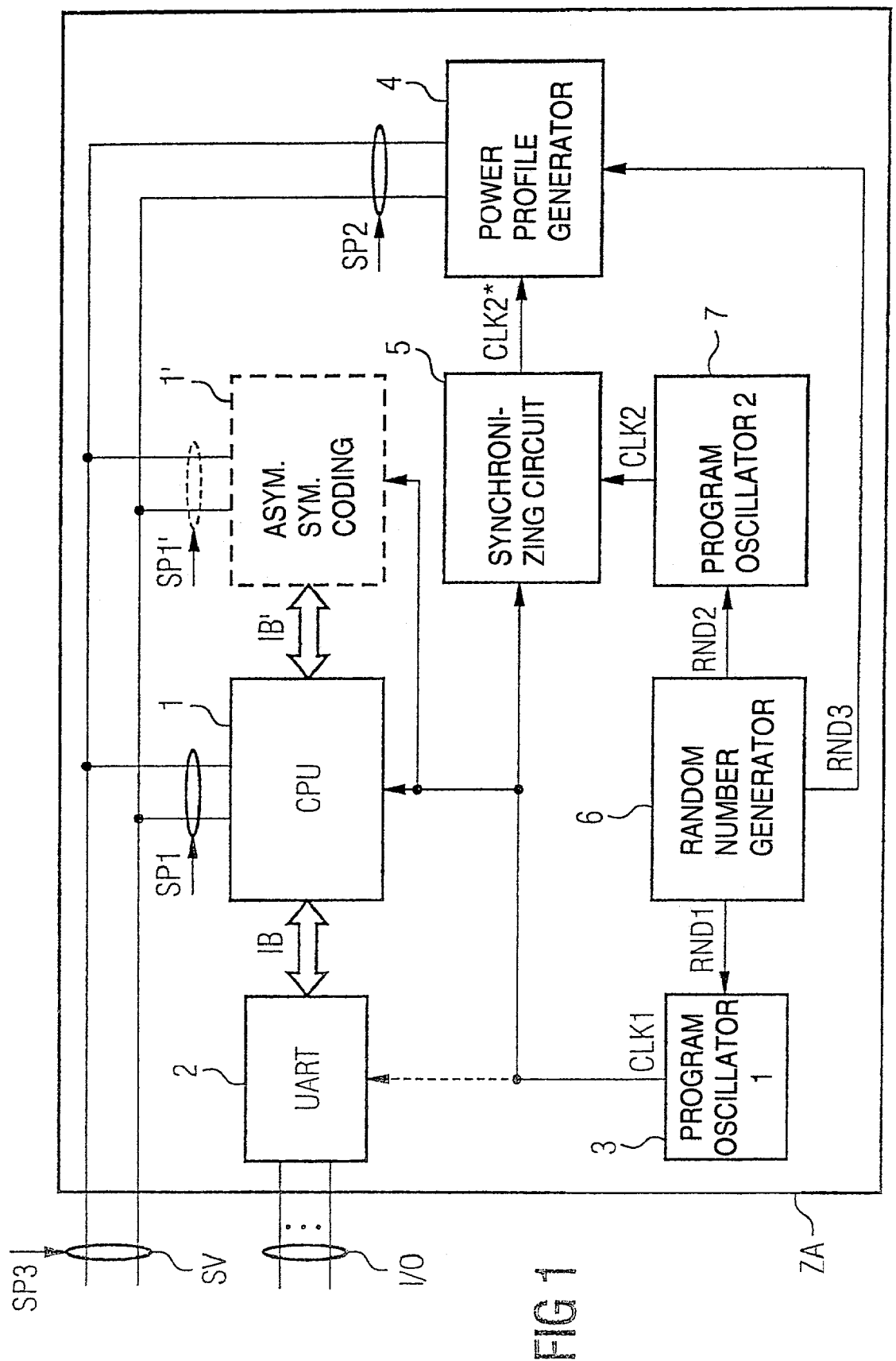
FIG. 1 is a simplified block circuit diagram of a cryptographic coding device according to the invention.

Referring now to the figures of the drawings in detail and first, particularly to FIG. 1 thereof, there is shown a simplified block diagram of a coding device for implementing a cryptographic encryption and/or access authorization such as is implemented, for example, in what is referred to as a chip card or smart card. The logic units of this smart card or chip card are preferably embodied here on a semiconductor module and combined in an automatic status device ZA.

The automatic status device ZA and the logic components of the semiconductor component have an input/output interface I/O for inputting and outputting the data to be encrypted and/or other data. A power supply interface SV is used for supplying power to the automatic status device ZA and the coding device and constitutes, as it were, the weak point for an attack by power analysis. The power supply interface SV substantially supplies all the components of the automatic status device ZA, only one connection to a data processing unit 1, 1' and a power profile generator 4 being illustrated for the sake of simplifying the illustration.

The data processing unit is usually composed of a central processing unit 1 (CPU) for processing the data, and optionally of an additional co-processor unit 1' that carries out, in particular, asymmetrical or symmetrical coding operations. Such cryptographic operations can, however, also be carried out exclusively in the central processing unit 1, without the co-processor unit 1'.

The cryptographic methods or protocols that are carried out by the central processing unit 1 or the additional co-processor unit 1' may cover, for example, a symmetrical authentication, a Diffie-Hellmann exponential key agreement, El Gamal cryptography with a public key, El Gamal signatures, digital standard signatures, RSA, and further coding algorithms. Such methods and coding protocols are generally in the prior art, for which reason a detailed description will not be given below.

An important feature of the present invention is, instead, the use of the power profile generator 4 in the automatic status device ZA that generates an interference power profile SP2 and superimposes it on the power profiles SP1 of the central processing unit 1 and SP1' of the optional co-processor unit 1' that can actually be used in the power profile analysis. The superimposition is used to prevent recovery of secret keys or confidential data by a power profile SP3 that can be tapped externally, such as is described below in more detail with reference to FIGS. 2 and 3.

Figure 2:
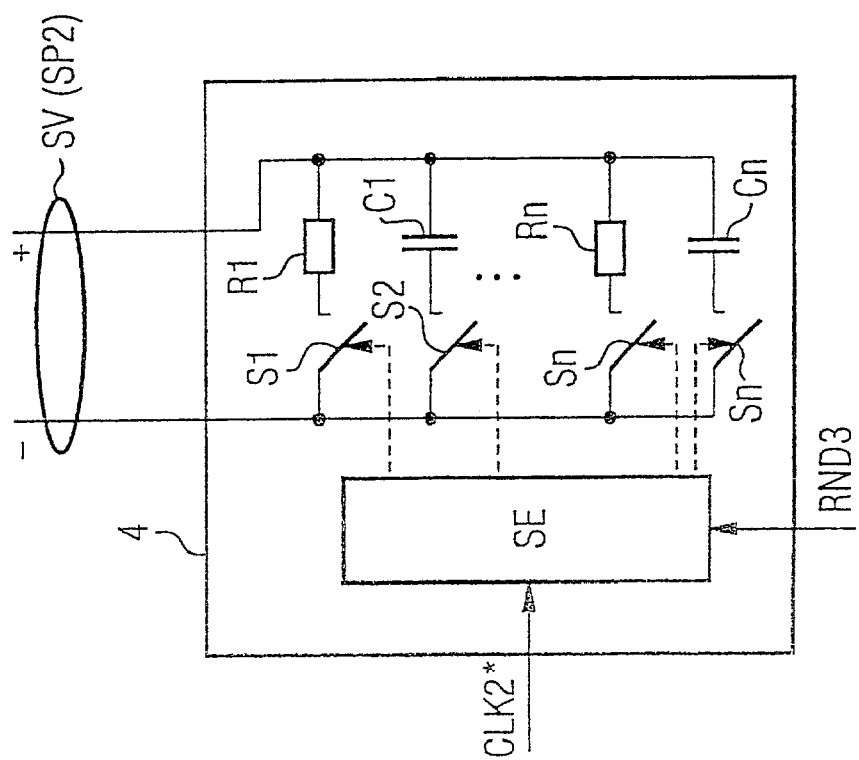
FIG. 2 is a simplified block and schematic circuit diagram of the power profile generator of FIG. 1.

FIG. 2 shows a simplified block diagram of an example of the power profile generator 4 that can be used. The power profile generator 4 includes a multiplicity of loads R1, C1, Rn to Cn, that can optionally be connected through switches S1, S2 to Sn. The switches S1 to Sn are preferably actuated by a control unit SE. The control unit SE can be actuated, for example, through a power profile generator clock signal CLK2* and/or a random number value RND3. All further methods of actuation are, however, also conceivable. All that is needed for the actuation of the power profile generator 4 is the fact that the multiplicity of loads can be unpredictably connected in the form of load resistors R1 to Rn in the form of load capacitors C1 to Cn such that an additional power consumption or an interference power profile SP2 is produced.

Figure 3:
FIG. 3 is a simplified time diagram of power profiles occurring in the coding device according to FIG. 1.
Figure 3:
Figure 3:

FIG. 3 shows a simplified view illustrating the principle for preventing a power analysis. According to FIG. 3, the central processing unit 1 generates the power profile SP1. At the same time, the power profile generator 4 generates the power profile SP2 that is superimposed on the power supply interface SV. As a result, a power profile SP3 that is composed of the power profile SP1 of the central processing unit 1 and the power profile SP2 of the power profile generator 4 is produced at the power supply interface SV and at the output of the power supply that is usually used by an attacker employing power analysis. Due to such superimposition, the power profile SP1 (or SP1') that is actually to be analyzed and that contains information allowing inferences to be made regarding secret keys or cryptographic methods can no longer be filtered out or recovered, or can only be filtered out or recovered with great difficulty.

The power profile generator 4 generates an interference power profile SP2 that has similar maximum deflections or peak to a power profile SP1 of the central processing unit 1 or a power profile SP1' of the co-processor unit SP1'.

To improve the protection against power analysis of such an encryptographic coding device, the automatic status device ZA according to FIG. 1 can also have a random number generator 6. The random number generator 6 generates pseudo-random number values RND3 that can be fed, for example, to the control unit SE of the power profile generator 4 and bring about a pseudo-random generation of the interference power profile SP2.

In addition, random number values RND1 can be fed to a main clock supply unit 3. As a result, a main clock signal CLK1 of the automatic status device ZA can be set in a variable fashion. The main clock supply unit 3 is preferably composed of a programmable oscillator (PLL, phase locked loop) that oscillates, for example, at a center frequency of 4 MHz and can be set in a variable fashion in a range from 3 to 7 MHz by the random number value RND1. Of course, other programmable selectors are also conceivable as the main clock supply unit 3. It is also possible for the clock frequency to be selected as a function of the respective processor types.

To decouple or isolate the external data interface I/O from an internal data interface IB, a conventional decoupling unit 2 is used. Such decoupling units 2 are referred to as UARTS and constitute a transmitter section and receiver section that are capable of adapting two different interfaces, i.e., the external data interface I/O and internal data interface IB and their different clock signals, to one another. Such decoupling units are generally in the prior art, for which reason a detailed description will not be given below.

Due to the pseudo-random fluctuations that are, thus, brought about in the main clock signal CLK1, a power analysis at the power supply interface SV is made more difficult. As a result, the protection of the automatic status device ZA against attacks by power analysis is improved further.

A configuration that is particularly secured against attacks by power analysis is obtained, in particular, if, in accordance with FIG. 1, a further secondary clock supply unit 7 is used in addition to the main clock supply unit 3, in combination with a synchronizing circuit 5. According to FIG. 1, the secondary clock supply unit 7 is also actuated by a random number value RND2 from the random number generator 6 such that it generates a pseudo-random secondary clock signal CLK2. The secondary clock supply unit 7 is preferably composed of a similar programmable oscillator (PLL, phase locked loop) to the main supply unit 3, but the center frequencies preferably differ from one another. Similarly, the frequency range of the secondary clock supply unit 7 also differs from the main clock supply unit 3, but they can also have the same center frequency and the same frequency range. However, due to the different random number values RND1 and RND2, the main clock supply unit 3 and the secondary clock supply unit 7 generate different clock signals CLK1 and CLK2 that are fed to the synchronizing circuit 5.

The synchronizing circuit 5 serves to prevent an effect according to which beating of the two oscillators can become visible in the power profile SP3 of the power supply interface SV. In addition, the synchronizing circuit 5 prevents correlation in the time domain and frequency domain between the main clock signal CLK1 and a power profile generator clock signal CLK2* that is generated by the synchronizing circuit 5, and that is preferably used to actuate the power profile generator 4 or its control unit SE.

FIG. 4 shows a schematic view of a preferred configuration for the synchronizing circuit 5. The synchronizing circuit 5 according to FIG. 4 includes a signal edge-triggered AND Gate with a delay. To delay the main clock signal CLK1 by a delay time τ, the synchronizing circuit 5 has a delay element 51. In addition, for generating the power profile clock signal CLK2*, the synchronizing circuit 5 has a signal edge-triggered AND Gate 52 for connecting through the secondary clock signal CLK2. To be more precise, the synchronizing circuit 5 connects the secondary clock signal CLK2 of the secondary clock supply unit 7 to the power profile generator 4 as a power profile generator clock signal CLK2* only if a new clock signal CLK1 is not currently being generated at the main clock supply unit 3. The synchronizing circuit 5 is, thus, triggered by the main clock signal CLK1 of the main clock supply unit 3 and allows the secondary clock signal CLK2 of the secondary clock supply unit 7 through only after a delay τ that is selected, or can be set, as a function of the technology or other parameters. The delay τ that is generated by the delay element 51 can preferably be configured or set.

In particular, as a result of the combination of the further oscillator or of the secondary clock supply unit 7 with the synchronizing circuit 5, an automatic status device ZA or a coding device for implementing a cryptographic encryption and/or access authorization is obtained that cannot be attacked by correlation analyses of power profiles. In particular, secret keys (private keys), signatures, electronic purses, write protection, etc., can, thus, be protected against unauthorized access.

As the data processing unit composed of the central processing unit 1 and the co-processor unit 1' cannot continuously carry out security-related operations, to reduce the power consumption and to further improve the security, the protective measures can be switched off temporarily. To be more precise, the random access number generator 6, the secondary clock supply unit 7, the synchronizing circuit 5, and/or the power profile generator 4 could temporarily be switched off if operations that are non-critical in terms of security are being carried out by the central processing unit 1 or its co-processor unit 1'

In particular, when the secondary clock supply unit 7 is used in conjunction with the synchronizing circuit 5, attacks by statistical analyses and/or evaluation of the power profiles in the time domain and/or in the spectral domain can be reliably prevented.

The invention has been described above by an automatic status device in a chip card or smart card. However, it is not restricted to such embodiments and, instead, covers all further automatic status devices that can be used, for example, in security-related microprocessor units or other security modules. In the same way, the present invention can be applied not only to asymmetrical encryption methods (cryptography) but also to all further encryption methods and in particular to symmetrical ones.

I claim:

1. A coding device for at least one of implementing cryptographic encryption and access authorization, comprising:
    a data processing unit programmed to implement cryptographic operations;
    an external data interface;
    an internal data interface;
    a decoupling unit connected to said data processing unit, said external data interface, and to said internal data interface, said decoupling unit decoupling said external data interface from said internal data interface;
    a main clock supply unit generating a main clock signal, said main clock supply unit connected to said data processing unit;
    a power profile generator unit for generating an interference power profile, said power profile generator unit connected to said main clock supply unit and to said data processing unit, said power profile generator unit having a secondary clock supply unit for generating a secondary clock signal, and said power profile generator unit having a synchronizing circuit for generating a power profile generator clock signal based upon said main clock signal and said secondary clock signal, said synchronizing circuit having an adjustable delay element for delaying said main clock signal; and
    a power supply interface for supplying power to the coding device, said power supply interface connected to said data processing unit and said power profile generator unit.

2. The coding device according to claim 1, wherein said power profile generator unit has a random number generator for generating random number values and changing said secondary clock signal as a function of said random number values.

3. The coding device according to claim 2, wherein said random number generator also changes said main clock signal as a function of said random number values.

4. The coding device according to claim 1, wherein said synchronizing circuit prevents correlation between said main clock signal and said power profile generator clock signal in the time domain and the frequency domain.

5. The coding device according to claim 1, wherein said synchronizing circuit prevents said main clock signal and said secondary clock signal from beating in a way visible at said power supply interface.

6. The coding device according to claim 1, wherein said synchronizing circuit has a signal edge-triggered AND gate for generating said power profile generator clock signal with triggering by said secondary clock signal as a delayed main clock signal.

7. The coding device according to claim 1, wherein:
    said data processing unit has a power profile with a maximum excursion; and
    said power profile generator unit generates said interference power profile to have a maximum excursion approximately equal to said power profile of said data processing unit.

8. The coding device according to claim 1, wherein said power profile generator unit can be switched off.

9. The coding device according to claim 1, wherein said power profile generator unit has an on-off switch for switching off said power profile generator unit.

10. The coding device according to claim 1, wherein said internal data interface connects said decoupling unit to said data processing unit.

11. A coding device for at least one of implementing cryptographic encryption and access authorization, comprising:
    a data processing unit programmed to implement cryptographic operations;
    an external data interface;
    an internal data interface;
    a decoupling unit connected to said data processing unit, to said external data interface, and to said internal data interface, said decoupling unit decoupling said external data interface from said internal data interface;

a main clock supply unit generating a main clock signal, said main clock supply unit connected to said data processing unit;

a power profile generator unit for generating an interference power profile, said power profile generator unit connected to said main clock supply unit and to said data processing unit, said power profile generator unit having a multiplicity of loads, a switching unit connected to said loads, and a power profile generator connected to said loads and to said switching unit, said power profile generator switching said loads with said switching unit to generate said interference power profile, said power profile generator unit having a secondary clock supply unit for generating a secondary clock signal, and said power profile generator unit having a synchronizing circuit for generating a power profile generator clock signal based upon said main clock signal and said secondary clock signal, said synchronizing circuit having an adjustable delay element for delaying said main clock signal; and a power supply interface for supplying power to the coding device, said power supply interface connected to said data processing unit and said power profile generator unit.

12. The coding device according to claim 11, wherein said power profile generator unit has a random number generator for generating random number values and changing said secondary clock signal as a function of said random number values.

13. The coding device according to claim 12, wherein said random number generator also changes said main clock signal as a function of said random number values.

14. The coding device according to claim 12, wherein said random number generator changes a switching behavior of said switching unit as a function of said random number values.

15. The coding device according to claim 11, wherein said synchronizing circuit prevents correlation between said main clock signal and said power profile generator clock signal in the time domain and the frequency domain.

16. The coding device according to claim 11, wherein said synchronizing circuit prevents said main clock signal and said secondary clock signal from beating in a way visible at said power supply interface.

17. The coding device according to claim 11, wherein said synchronizing circuit has a signal edge-triggered AND gate for generating said power profile generator clock signal with triggering by said secondary clock signal as a delayed main clock signal.

* * * * *